United States Patent [19]
Bendix

[11] Patent Number: 6,157,088
[45] Date of Patent: Dec. 5, 2000

[54] WIND ENERGY SYSTEM

[76] Inventor: Horst Bendix, Wilsnacker Str. 36, Leipzig, Germany, 04207

[21] Appl. No.: 09/171,108

[22] PCT Filed: Apr. 10, 1997

[86] PCT No.: PCT/EP97/01788

§ 371 Date: Oct. 13, 1998

§ 102(e) Date: Oct. 13, 1998

[87] PCT Pub. No.: WO97/39240

PCT Pub. Date: Oct. 23, 1997

[30] Foreign Application Priority Data

| Apr. 12, 1996 | [DE] | Germany | 196 14 538 |
| Jun. 14, 1996 | [DE] | Germany | 196 23 376 |
| Aug. 20, 1996 | [DE] | Germany | 196 33 433 |

[51] Int. Cl.⁷ .................................................. F03D 11/04
[52] U.S. Cl. ............................................ 290/55; 290/44
[58] Field of Search ............................ 290/44, 43, 54, 290/55

[56] References Cited

U.S. PATENT DOCUMENTS

| 4,180,369 | 12/1979 | Ottosen | 415/2 |
| 4,184,084 | 1/1980 | Crehore | 290/55 |
| 4,447,738 | 5/1984 | Allison | 290/44 |
| 5,289,041 | 2/1994 | Holley | 290/44 |
| 5,419,683 | 5/1995 | Peace | 416/227 A |
| 5,694,774 | 12/1997 | Drucker | 60/641.11 |

FOREIGN PATENT DOCUMENTS

| 427 979 | 3/1911 | France | F03D 11/04 |
| 742 242 | 5/1943 | Germany . | |
| 830 180 | 7/1949 | Germany . | |
| 25 07 518 | 8/1976 | Germany | F03D 11/04 |
| 31 06 777 A1 | 9/1982 | Germany | F03D 3/02 |
| 91 01 481 | 2/1991 | Germany | F03D 9/00 |
| 92/08893 | 5/1992 | Germany | F03D 3/00 |
| 42 36 092 A1 | 4/1994 | Germany | F03D 1/02 |
| 44 32 800 A1 | 3/1996 | Germany | F03D 11/04 |

OTHER PUBLICATIONS

Erich Hau, "Windkraftanlagen", 1988, pp. 387–389.

*Primary Examiner*—Nick Ponomarenko
*Attorney, Agent, or Firm*—Cohen, Pontani, Lieberman & Pavane

[57] ABSTRACT

The invention relates to the utilisation of a decommissioned power station or industrial chimney (1) made of concrete as a tower for a wind converter (2) with a high electrical output with a rotor with a substantially horizontally arranged rotor axis (20), on whose point rotor vanes (9) are located in a flying manner, after shortening by a degree determinable on the basis of static and dynamic conditions, and attachment of securing means, upon which the wind converter is rotated eccentrically to and with a degree of rotational freedom about the vertical axis of the chimney, into the respectively optimum wind direction.

Alternatively, a steel base (6, 7, 12, 16) may be set on the thus shortened chimney in order to mount the wind converter, in such a way that the rotor vanes can pass the chimney at a predeterminable spacing. (FIG. 1)

17 Claims, 6 Drawing Sheets

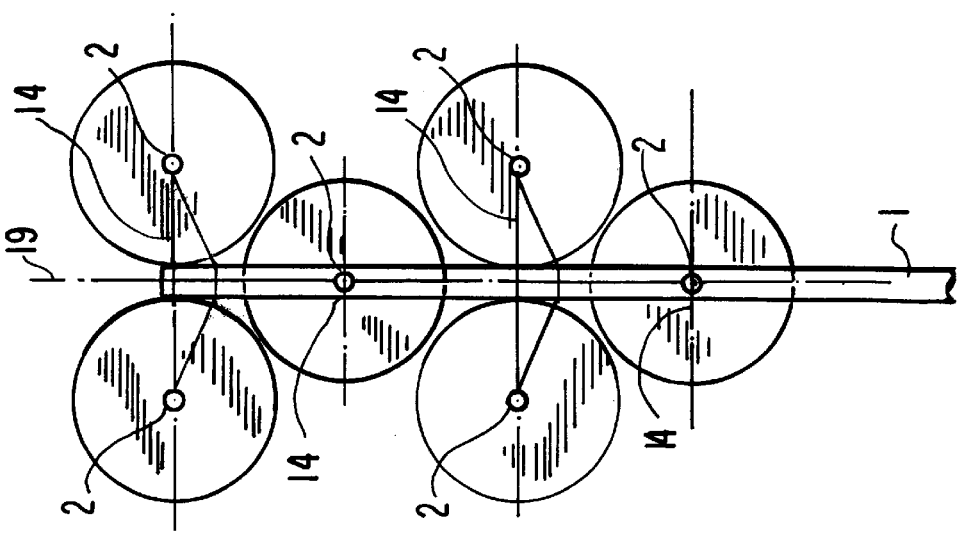
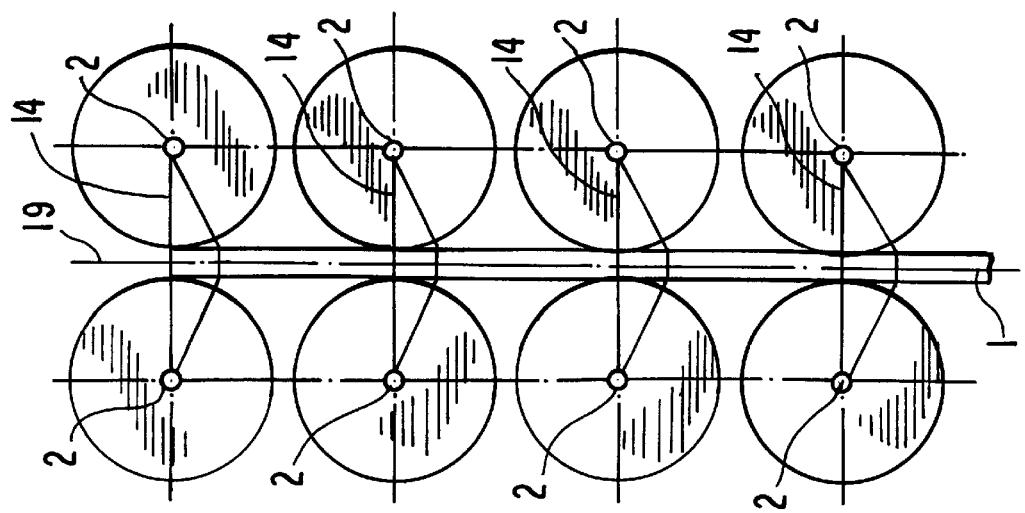
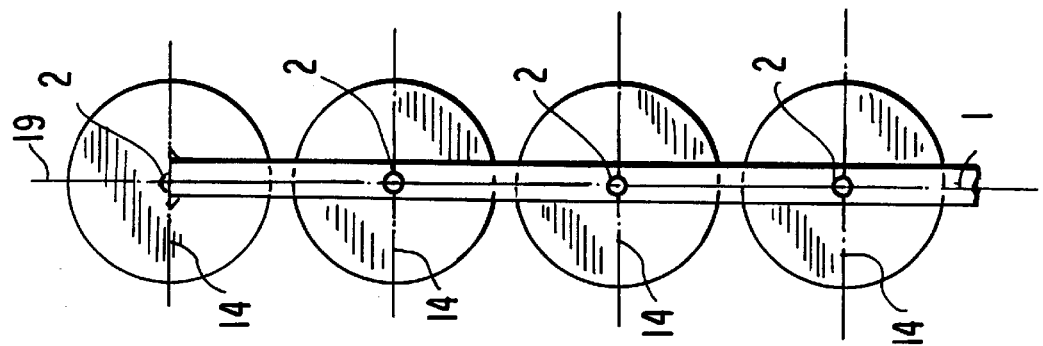

WIND ENERGY SYSTEM

BACKGROUND OF THE INVENTION

1. Field of the Invention

The invention relates to the utilization of a decommissioned power station chimney or industrial chimney made of concrete as a tower for a wind converter with high electrical output having with a rotor with a horizontal rotor axis upon whose point there are mounted flying rotor vanes.

2. Description of the Prior Art

Wind energy systems belong to a group of alternative, environmentally friendly renewable energy sources and are used to an increasing extent for the generation of electrical power. Wind is not available permanently as an energy source, nor at a uniform intensity. It is known that for these reasons wind power plants are usually erected in areas which have frequent and notably high wind velocities.

As a rule, most prior art wind energy systems include a tower comprising a concrete or steel construction or a mixed construction, including the associated foundation and, on the upper end of the tower, a wind converter with a rotary arrangement for free rotation through 360° (Wind Power Systems, Springer Verlag, Berlin, DE 1988, pages 388, 390). With the aid of the rotary device, the converter is rotated concentrically into the respective wind direction in an automatic manner via corresponding measuring and control devices.

The operating heights of conventional converters are restricted to a hub height or rotor axis of 20 to 65 m by the high costs for foundations and tower and by problems in transporting completed towers or sections to the site. The highest nominal output yet known of a single converter was achieved in Germany with the wind power system GROWIAN and other prototypes, at about 1500 kW. These and other constructions however involved the disadvantage of a restricted tower height or of excessively high investment for higher towers, so that, in less windy inland regions, the chances for an economically viable power system are poor.

Basic research into utilization of wind energy by windmills was published in a re-print from 1926 in Betz, Wind-Energie, Ökobuchverlag, Stauffen, DE, 1982 with illustrations of: frequency distribution of predominating wind velocities, illustration 1; distribution of the annual energy yield, illustration 34; alteration in wind velocity in dependence on measured height, illustration 2; and theoretical calculations for possible power outputs for wind power systems, shown for wind wheel diameters up to 100 m in a nomogram, illustration 10.

This basic document indicates that only those rotors with profiled vanes and horizontal axle position are favourable in energy terms, which use lift on the rotor as a parameter.

Wind wheels with a perpendicular axis are indicated for large-scale systems above 1000 kW, yet are shown as unfavourable from the energy point of view.

A prior art wind generating system is known from DE 31 06 777 A1, in which high towers, such as a chimney of a constructive height of 150 m and a diameter of 15 m are disclosed, about which wind wheels are to rotate in a vertical axis In a similar way, in WO 92/08893 discloses the use of an industrial chimney or tower which is still in operation. In this case two plates are mounted on support arms of a support ring at the chimney head or the chimney shaft which, due to their wind resistance, rotate about the operating chimney.

The theoretical principle that windmills rotating about a vertical axis have a very poor degree of efficiency and are inferior to rotors having a horizontal axis and different vane profiles, as established by the author Betz, applies for these prior art devices in references DE 31 06 777 al and WO 92/08893.

There is no indication to be found in these documents as to whether the chimney constructions given as an alternative may be simply used.

The document DE-C 830 180 discloses another prior art device including a guyed tower on which converters, which are mounted on jibs on the tower, have a degree of freedom of rotation about the tower. As soon as high winds or storms are to be expected, the jibs are lowered with the converters. If necessary, the cables used for lowering the converter are also used as guy cables for the tower to prevent the storm from bending the mast or to prevent the occurrence of dangerous resonant vibrations in the tower. The tower is clearly a system consisting of steel components with spread support feet.

Another prior art device known from DE-C 742 242 includes a lattice tower with structures freely rotatable about said lattice tower and upon which a plurality of identical converters of the same output are located. The system is extremely expensive to construct, both as regards the type of tower and as regards the support structures for low-power converters.

Further literary sources on this theme are given in the following. Their content is regarded as prior art and incorporated by reference into the disclosure of the present invention:

Bundeswirtschaftsministerium, Erneuerbare Energien verstärkt nutzen, Bonn, DE, May 95, 3rd edition [Federal Ministry of Economics, the increased use of renewable energy].

Company documents:
ENERCON, Aurich,DE,No 26605
Tacke, Windtechnik [Wind Technology], Salzbergen,DE, No 48499
Micon, Randers-Denmark, No 8900
German periodical: Sonnenenergie & Wärmetechnik [Solar Energy and Heating Technology]1/96, pp 22–27 and 5

Rauser, Steigerung der Leistungsausbeute von Windenergie-Konvertern [Increase in the Output of Wind Energy Converter], Herrengut, Baden-Baden, DE, 1983.

ISET document sequence, Kassel 95 NMEP on width test 250 MW wind, Annual Evaluation 1994.

Windmessungen in großer Höhhe [wind measurements at great height], Institut für Meteorologie und Klimatologie and der Univesität Hannover, DE, 1996.

Reports of the German Weather Service, privately published, Offenbach, DE 1983 and further years (up to 89)

Bundesforschungsministerium Forschungsbericht [Federal Research Ministry, Research Report ]T 85–146, measurements of wind field at various heights . . . and Report by G. Tetzlaff, Wind Measurement at Great Height, Eggenstein and Leopoldshafen, DE, 1986.

Müller, Fritz, Dynamische Berechnung von Massivschornsteinen [Dynamic Measurement of Solid Chimneys], Hauptverband Deutsche Bauindustrie, 1977.

Fördergesellschaft Windenergie e. v.,[Sponsoring Body for wind Energy (registered association)], Wind-power catalogue Vulkan-Verlag, Essen, DE, 1989.

SUMMARY OF THE INVENTION

It is an object of the present invention to provide an economically-operating wind power plant which is economically feasible, even in inland areas.

The object of the present invention is achieved by using a decommissioned power station chimney or an industrial chimney as a tower for a wind converter. The tower is shortened based on static and dynamic conditions that the tower is subjected to, including conditions incurred with the wind converter, and a retaining means is attached off center to and with a degree of freedom about a vertical axis of the chimney. Instead of retaining means a steel understructure may be positioned within the chimney for supporting the wind converter and so that the rotor vanes of the wind converter pass the chimney at a predetermined spacing.

The invention proceeds from the theoretical basic principles relating to increasing wind velocities in heights greater than those achievable with known wind power systems. Height is understood to be the distance between the earth or foundation and the rotor axis or the hub, which is aligned substantially horizontally, if necessary with a slight inclination in order to achieve a sufficiently large spacing between the vanes and the tower.

Wind power systems then reliably and more rapidly achieve significant economy compared to conventional market energy costs as they increase their annual energy yield and lower the necessary investment costs for their erection. The annual energy yield is to a decisive extent dependent on the average wind velocity available or occurring at the site. The performance P is calculated from the following formula:

$P = C \times V^3 \times A$, with $C$ = constant, in dependence on the air density (kg per m$^3$)

$V$ = wind velocity at any moment (m/s)

$A$ = area entirely contacted by the wind and passed over by the rotor vane (m$^2$)

From this formula, it arises that the wind velocity enters the possible energy yield at the third power. To a certain extent, in the lower atmospheric regions the average wind velocity increases as height increases. Compared to the measured height normally used by the meteorological service, the wind velocity at a height of 100 m is 50% more. This theoretically gives windmills mounted at a height of 100 m three to five times the energy yield compared to windmills close to the ground. If the height of a windmill undergoes an increase from about 50 m to 150 m, the energy yield in all can increase by a multiple of 1.7 to 2.2, depending on the wind speed. With comparable values for a converter with a hub height of 70 m, with converters with a hub height of 110 m there is an increase in annual energy yield of 50%, where the height is the distance of the rotor axis above the ground.

The investment costs for the necessary component parts and infrastructure increases to a decisive degree as the hub height of the converter increases. The economically acceptable and technically feasible hub heights are therefore restricted, so that at present for large converters, a maximum tower height of 65 to 70 m has been achieved.

Greater heights can only be reached if the hub height can be successfully achieved without an extreme increase in building costs with correspondingly slim and slender but at the same time sufficiently stable structures. According to the present invention, existing but decommissioned industrial power station chimneys made of concrete, particularly of steel-reinforced concrete, have proved particularly suitable, being at present available in large numbers as many coal-fired power stations, district heating stations and other coal fired industrial plant have been decommissioned or converted to different fuels. The change in use of such steel-reinforced concrete chimneys which are no longer required is economically feasible and makes possible the necessary higher placing of the wind converter to justify the considerable investment costs. In this connection it is particularly favourable that the power stations as a rule have been equipped with power generating and distributing systems, and as a result the subsequent transformer systems and distribution systems are to a large extent already in place.

Therefore, in favourable cases, the investment outlay for a wind power system which operates at above 100 m, is reduced by more than 25% of the overall plant costs. It is known that not only the erection of the tower, but also the management and connection of the power generator to the regional power distribution infrastructure are counted among these investment costs.

Chimneys are envisaged which reach heights of between 100 and 300 m, with a base diameter of 25 m and a diameter at the top of the chimney of 2 to 7 m.

Upon closer consideration as to whether other chimneys are usable which have not been constructed on the steel-concrete principle, it was discovered that in the case of large-scale wind power systems with outputs between 600 kW and 1500 kW, such static loads inclusive of wind pressure, but in particular also dynamic loads due to vibrations are placed on the construction that chimneys of a different constructive type cannot be considered. In order to avoid overloading the structure, firstly a measurement of the possible static and dynamic load-bearing capacity by one single or a plurality of converters must be determined, the chimney must then be dismantled to the height dimensions remaining or calculated therefrom, before the converter is installed with the maximum possible hub height For these reasons, only high chimneys made of steel and concrete are substantially usable.

Chimneys shortened in this way cannot as a rule be directly provided at their top with a wind converter of a conventional type, as the rotor vanes collide with the edge of the chimney. Particular care should be taken that the rotor vanes must have a free space between the vanes and the outer edge of the tower. If is free space from the tower chimney is not guaranteed, aerodynamic shock loads on the rotor vane can occur each time it passes the chimney, which would lead to breakage of rotor vanes and other damage, including vibratory damage to the chimney.

For these reasons, when locating wind power systems on the chimney head, it must firstly be ensured that the dismantled chimney, which frequently at such a shortened constructive height still has a diameter of 6 m or more, is firstly provided with a concrete or steel construction as a base for the converter, on the one hand enabling rotation of the rotor vane beyond the edge of the chimney, and on the other hand rotation through 360° of the entire converter about the chimney axis, in order to be able to place the rotor vanes in any optional wind direction, or to bring them into specific positions for assembly work.

In order to ensure this free space for the rotor vanes, there must therefore be used, either on the dismantled chimney, a steel tower with a height corresponding to the length of the rotor vanes, which in turn will lead to greater hub heights, and causes the rotor vanes to rotate above the chimney head or, according to the invention, other alternatives are used to ensure a free space between rotor vanes and the edge of the chimney.

Another alternative is to place the rotor as close as possible to the edge of the chimney so that the rotor vanes can swing past it. For this embodiment there is the possibility of ensuring the necessary eccentricity relative to the axis of the chimney by means of an eccentric intermediate ring with an adapted rotary connection, as is known in theory from prior art. The second possibility resides in placing an intermediate ring on the chimney head which, in the manner of a sun wheel gear, likewise enables eccentric positioning of the converter axis to the tower axis. Depending on the wind direction, the converter can then be rotated on a ring track on the chimney head. A further possibility consists in mounting a ring on the chimney head and in locating thereon a carriage or a horizontally rotatable bracket, upon which in turn the converter can be rotated eccentrically to the axis of the chimney.

Where the shortened chimneys reach a diameter of less than the 6 m mentioned, an alternative could be to equip the converter with an extended rotor axis, so that the necessary spacing is achieved between the rotor vanes and the edge of the chimney.

Apart from arranging a converter on the chimney head, however, chimneys with a height of 300 m, which after dismantling may have a height of about 250 m, can be used in another way, a support construction being mounted to the periphery of the chimney, upon which a converter may be freely rotated about the shaft of the chimney as if on a cluster ring.

For static reasons it may be logical to locate these converters as parallel converters on opposite sides of the shaft of the chimney. Thus according to the invention support constructions can be chosen which only have a vertical support, when they afford appropriate security against tilting for the high-performance converters, which weigh 10 to 60 tons or even more In an alternative construction apart from such a support ring or such a support structure for supporting the converter weight, which serves at the same time as an encircling travelling track for the converter, the construction can be so designed that the converter is additionally secured by a traction or retaining rod, which is placed in a ring configuration about the shaft of the chimney above the converter.

In some cases, when particular static or dynamic threshold conditions predominate, it may be logical according to the invention to pass this traction or retaining rod from the converter as far as the opposite side of the chimney, in order to cancel traction and shear forces or corresponding vibrations against one another.

When extremely high towers are used and high-performance converters are installed, a plurality of converters can even be located on such support devices engaging around the chimney. In this case it depends on the respective static and dynamic threshold conditions and on the aerodynamic suitability, which number and which height is technically and economically feasible at which converters for example may be mounted with one another on the shaft of the tower, e.g. in pairs or alternatively as pairs and as single converters.

The most important criterion is that the largest possible rotor surfaces are to be mounted at the greatest possible height in a staggered manner on the chimney.

BRIEF DESCRIPTION OF THE DRAWINGS

In the drawings, wherein like reference characters denote similar elements throughout the several views:

FIG. 8 shows multiple converters connected to the chimney;

FIG. 9 shows another embodiment of the wind energy system of FIG. 8; and

FIG. 10 shows yet another embodiment of the wind energy system of FIG. 8.

DETAILED DESCRIPTION OF THE PREFERRED EMBODIMENTS

Figures 1, 2:
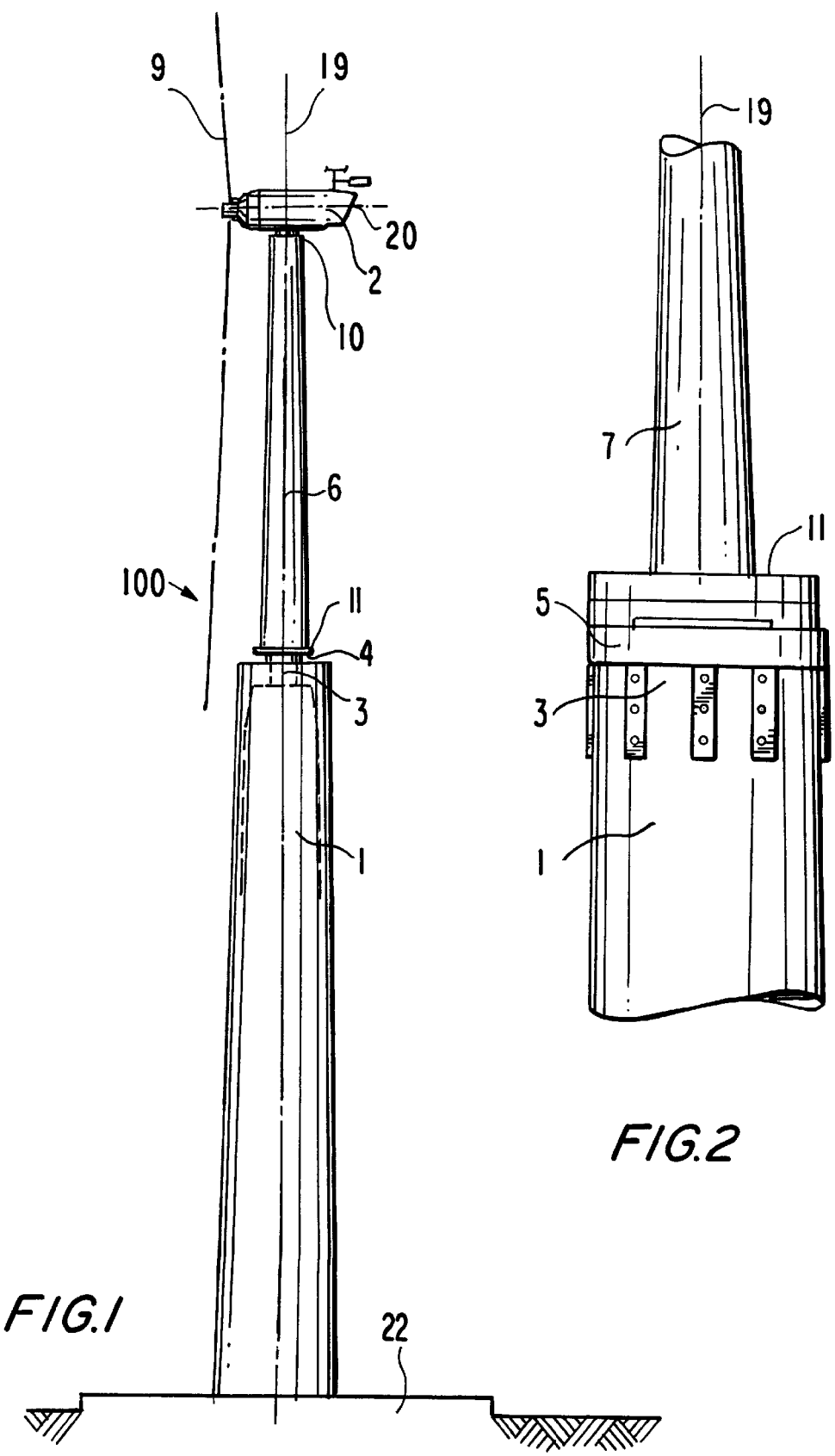
FIG. 1 shows a wind energy system on a decommissioned chimney according to an embodiment of the present invention.
FIG. 2 shows a central section of a wind energy system according to another embodiment of the present invention.

FIG. 1 shows the upper end of the converted and re-utilised steel-reinforced concrete chimney 1 which has been altered in such a way that an upper steel tower 6 can be located thereon. Thus a wind power system 100 according to an embodiment of the present invention comprises a lower chimney 1 resting on a foundation 22 and with, attached thereon, an upper steel tower 6. In addition, the upper end 3 of the chimney 1 is provided with a receiving part 4 mounted in the chimney, which in turn is capable of receiving a cylindrical or conical portion 6, of the tower carrying a converter 2. The converter 2 with its rotor vanes 9 and rotary mechanism 10 fulfils its normal function without hindrance from the lower portion of the chimney 1, because the rotor vanes 9 rotate laterally of the tower or at a corresponding height of the rotor axis 20 above the upper end 3 of the chimney 1.

In the upper end, apart from the specific provisions for the receiving part 43, the internal ascending access and the wiring are integrated, and a necessary safety rail 11 of the operating platform is attached to the outside.

FIG. 2 shows the solution according to the invention as another embodiment, when the receiving part is not integrated directly into the shaft of the chimney 1, but, an integrated bolt collar 5, with the embodiments corresponding to the calculated static and dynamic forces and measurements, is both screwed to the upper end 3 of the chimney 1, and also accommodates an upper tubular steel tower 7 via the integrated bolt collar 5.

Figure 3:
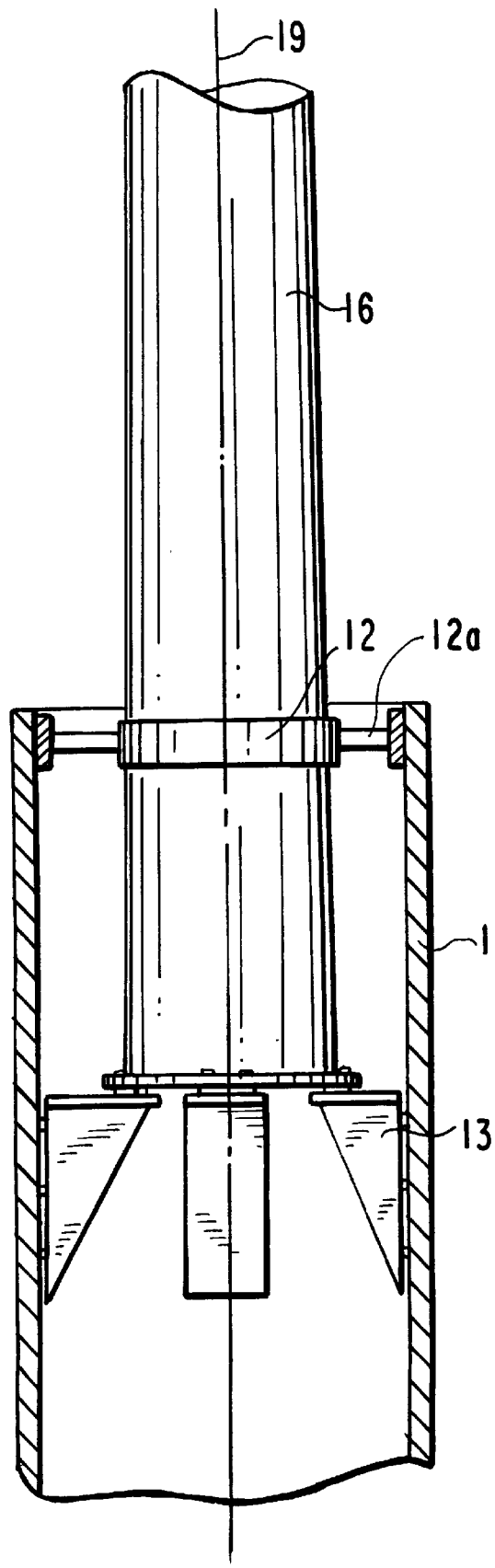
FIG. 3 shows a central section of another embodiment of a wind energy system showing the attachment of a converter to the chimney.

FIG. 3 shows the solution according to another embodiment of the invention in which a tubular tower portion 16 is inserted from above, at a length considerably greater tan the diameter of the foot of the tubular steel tower section, into the chimney 1. Its unladen weight and the vertical power components from wind stresses on a ring or a plurality of brackets 13 attached to the inner diameter of the chimney 1, and the horizontal forces, are additionally supported via a support ring 12 and/or a plurality of support brackets at the upper end of the chimney.

Figure 4:
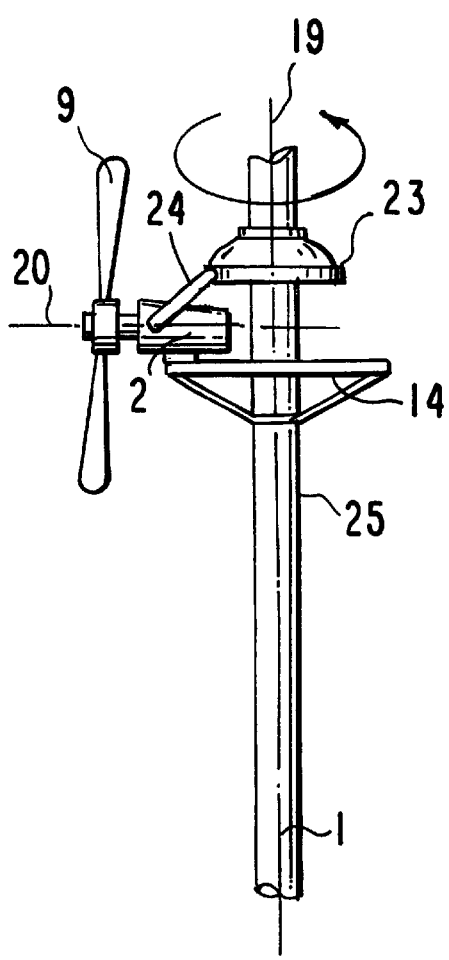
FIG. 4 shows a wind energy system connected to a chimney using a rotating carrier ring according to an embodiment of the present invention.

FIG. 4 illustrates the solution according to the invention showing how the converter 2 is rotatably mounted externally about the chimney 1 on a carrier ring 14, the existing tilting forces, where the carrier ring 14 is not a supported device transferring tilting momentum, being absorbed by traction or retaining rods 24 to the securing construction 23 at a corresponding height above the carrier ring 14. Thus the entire construction is so designed that the auxiliary constructions such as mounting ladders 25 or elevators, operating platforms, raising mechanisms not shown in the drawing and necessary for servicing work, are disposed internally in the concrete chimney so as not to hinder the functional reliability of the wind power system, or the existing external ladders are used.

Figure 5:
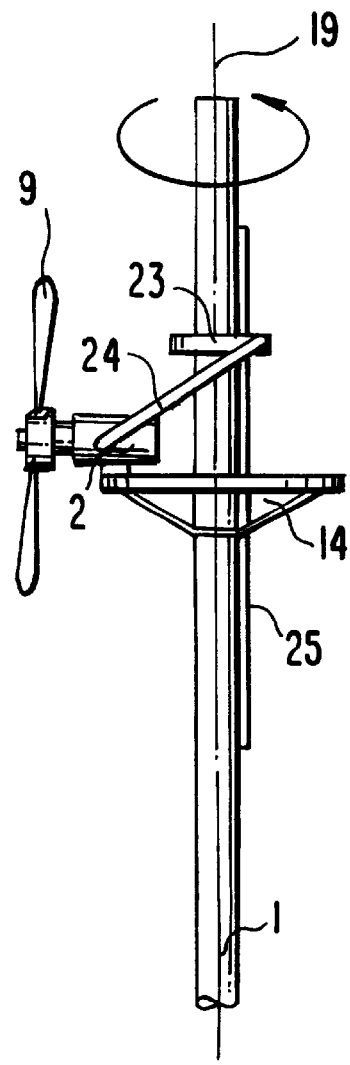
FIG. 5 shows another embodiment of the wind energy system of FIG. 4.

FIG. 5 discloses the solution according to the invention, when the tilting forces present are more favourably transmitted, with corresponding dimensions of the tower 1, on the side of the tower lying opposite the converter 2, by means of an elongated retaining rod 24.

Figure 6:
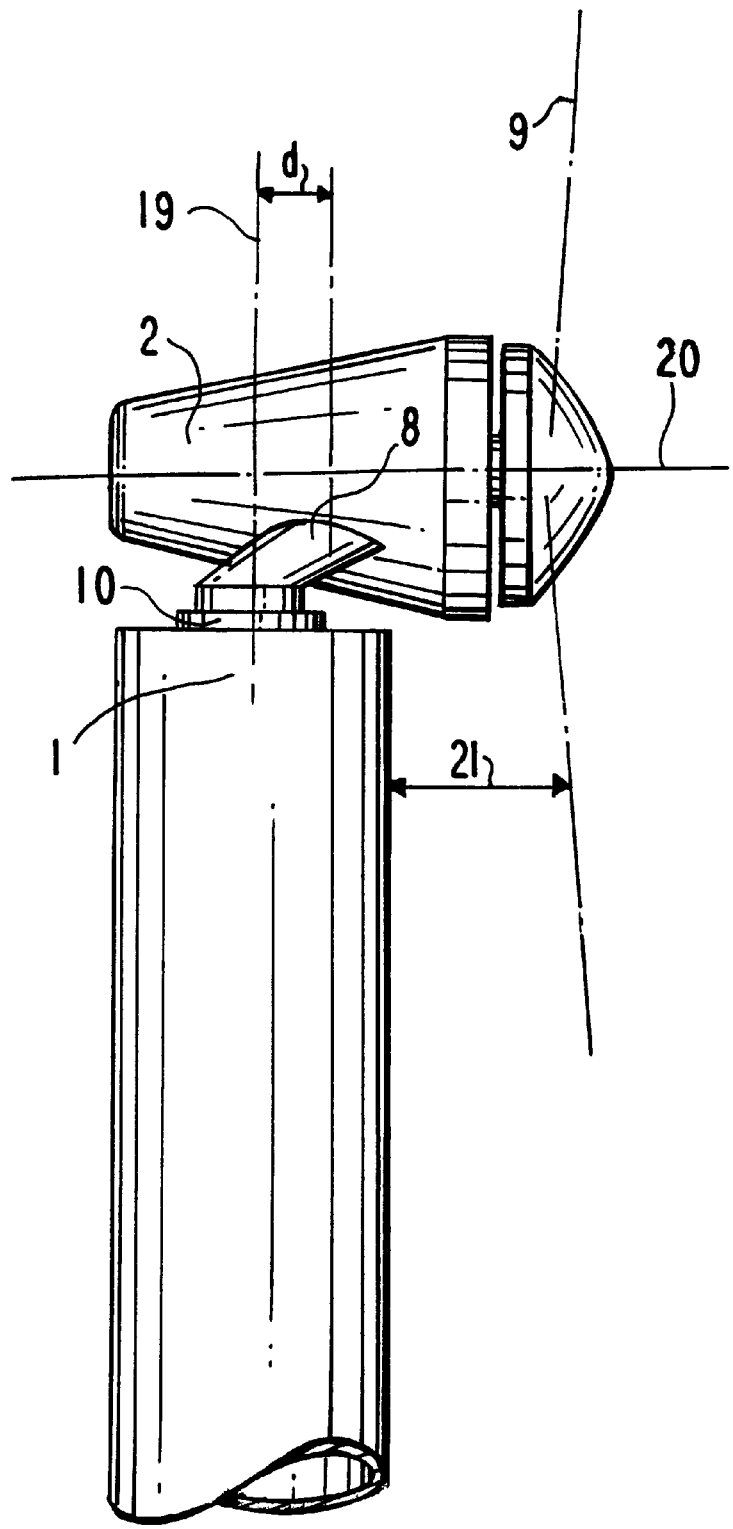
FIG. 6 shows wind energy system with the converter attached to the chimney using a support ring with an eccentric piece.

FIG. 6 shows how the converter 2 is located at an eccentricity d from the vertical rotary axis 19 to ensure the sufficient vane spacing 21 between the outer side of the tower 1 and the rotor vanes 9, via an eccentric carrier 8 between the converter 2 and the concentric rotary mechanism 10 on the chimney 1.

Figure 7:
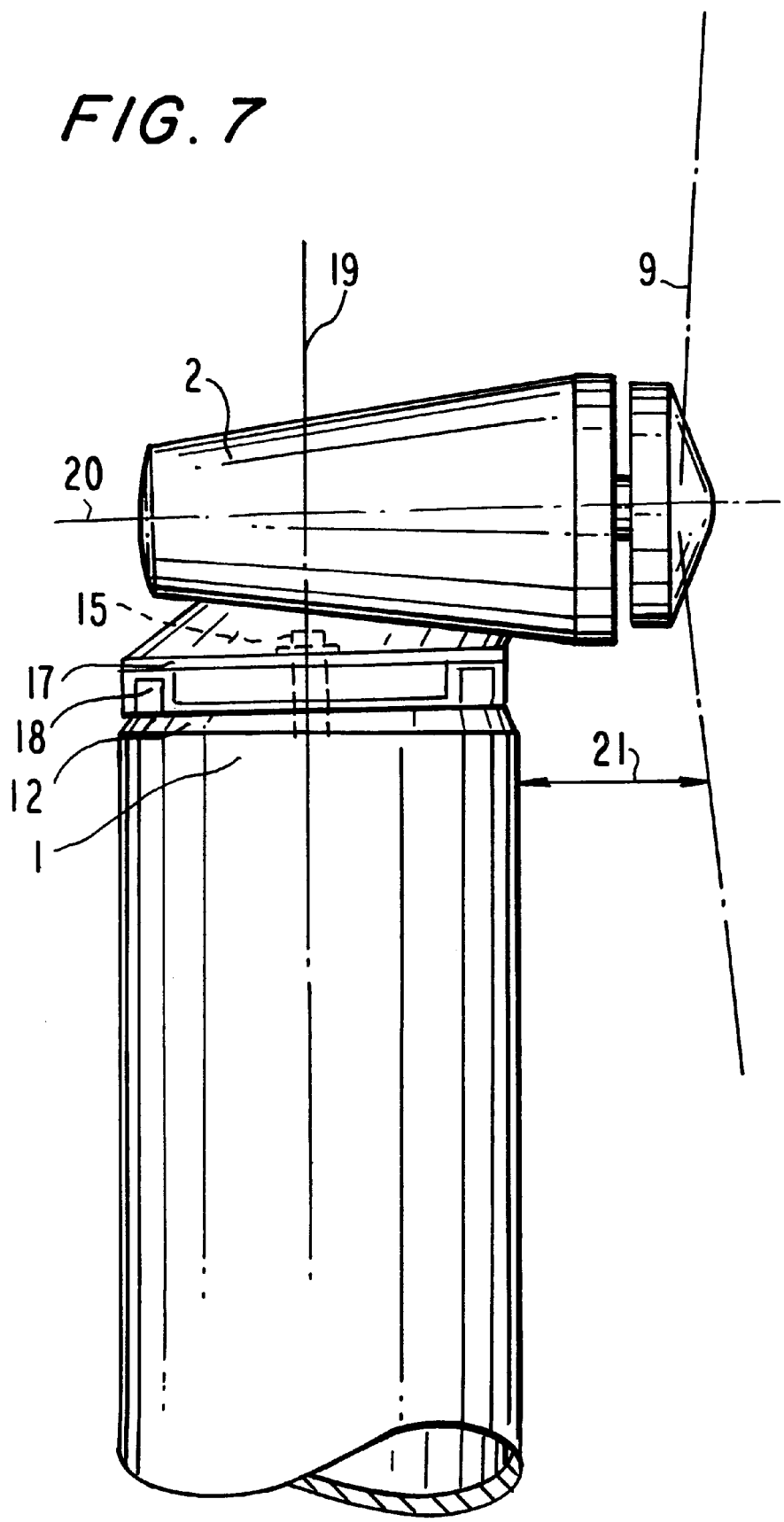
FIG. 7 shows another embodiment of the wind energy system of FIG. 6.

FIG. 7 shows how the converter 2, with large output capacity due to its dimensions and mass, and in order to ensure the sufficient vane spacing 21, particularly in the case of extremely large tower dimensions of for example 5 m diameter, is located at the new chimney head via a central running and carrier ring 14 on an intermediate frame 17 with concentrically arranged runner rollers 18 and central securing bolts 15 on the upper edge of the chimney 1. One of the rings 14 or rollers 18 may be driven, in order when required to bring the converter 2 into a lee position, or into a position for assembly work.

FIG. 8 shows four converters 2 one above the other. The three lower ones are located on carrier rings 14 which are in the form of securing means surrounding the chimney 1, similar to the arrangements in FIGS. 6 and 7, yet only as a support construction transmitting tilting moment, without traction or retaining rods 24 and the retaining construction 23. On the other hand the upper converter 2 may include a carrier ring 14 as shown in FIGS. 6, 7, or may be replaced by a construction according to FIGS. 1 to 3.

FIG. 9 shows the parallel arrangement of two converters in each case located on a respective carrier ring 14, while FIG. 10 shows converters 2 located in alternating pairs with single converters located therebetween. This arrangement, or a mixed form of the respective arrangements according to FIGS. 1 to 10, is to be provided in cases resulting from specific static dynamic necessities.

Should an analysis of vibration or load capacity show for example that the load with converters of the 1500 kW class with a rotor diameter of 65 m at weights of up to 100 t prevents an arrangement according to FIG. 9, the arrangement according to FIG. 8 or 10 could be used as an alternative. By staggering the units according to FIG. 10, taking into account the aerodynamic conditions of spacing, additional height for the single converters located between the parallel converters can be obtained with windy regions. In these arrangements in FIGS. 8 to 10 the system proceeds from a chimney height of e.g. 300 m with heights of the carrier rings 14 or attachments of the converters in heights of 300 m, 220 m, 140 m and 60 m.

List Of Reference Numbers

1 Chimney
2 Converter
3 Tower terminal
4 Receiving portion
5 Bolt collar
6 Steel tower
7 Steel tower
8 Carrier
9 Rotor vanes
10 Rotary mechanism
11 Railing
12 Support ring
13 Bracket
14 Carrier ring
15 Securing bolts
16 Tubular steel tower
17 Intermediate frame
18 Runner rollers
19 Rotary axis of converter
20 Rotor axis
21 Vane spacing
22 Foundation
23 Retaining construction
24 Traction or retaining rod
25 Cables

What is claimed is:

1. A wind energy system, comprising:
a chimney comprising one of a decommissioned power station chimney and an industrial chimney having an upper end, a base end, and a vertical center axis, wherein said chimney comprises a reinforced concrete material;
a wind converter having a rotor rotatable about a substantially horizontal rotor axis for producing an electrical output and rotor vanes mounted proximate an end of said rotor. wherein a capacity of said electrical output comprises at least 600 kW;
a retaining means for supporting said wind converter; and
a receiving part arranged on said chimney for rotatable supporting said retaining means such that said rotor vanes pass said chimney at a distance that prevents aerodynamic shock loads on said rotor,
wherein said chimney is cut to a height at which said wind converter is supportable without causing structural overload of said chimney based on static and dynamic considerations of said chimney and a configuration of said wind converter.

2. The wind energy system of claim 1, wherein said retaining means comprises a support for said wind converter rotatably mounted on said receiving part proximate said upper end of said chimney for rotation about said vertical center axis, wherein said wind converter is mounted on said support eccentrically to said vertical center axis.

3. The wind energy system of claim 1, wherein said retaining means comprises an understructure mounted on said receiving part proximate said upper end of said chimney, said wind converter being mounted on said understructure for rotation about said vertical center axis.

4. The wind energy system of claim 1, wherein said receiving part comprises a concrete shaft and a bolt collar mounted proximate said upper end.

5. The wind energy system of claim 4, wherein said concrete shaft and bolt collar are arranged in an internal central passage of said chimney.

6. The wind energy system of claim 1, wherein said receiving part comprises a plurality of bores distributed about a circumference of said chimney proximate said upper end; and a bolt collar connectable to said chimney via screw bolts threadably insertable into said bores.

7. The wind energy system of claim 1, wherein said retaining means for rotatably supporting said wind converter comprises a steel tower having a base anchored on said receiving part proximate said upper end of said chimney.

8. The wind energy system of claim 1, wherein said retaining means for rotatable supporting said wind converter comprises a steel tower inserted in said upper end of said chimney;

means for supporting said steel tower in said chimney for preventing vertical movement of said steel tower and one of a bracket means and a support ring in said chimney for preventing horizontal movement of said steel tower.

9. The wind energy system of claim 1, wherein said receiving part comprises a carrier ring mounted on an external circumference of said chimney, said wind converter being mounted on said carrier ring via said retaining means and movable along said carrier ring for concentric movement around said chimney.

10. The wind energy system of claim 9, wherein said receiving part further comprises a securing ring mounted on an external circumference of said chimney and said retaining means comprises one of a traction bar and a retaining rod connecting said securing ring to said wind converter for absorbing a tilting motion of said wind converter.

11. The wind energy system of claim 9, wherein said carrier ring prevents a tilting movement of said wind converter.

12. The wind energy system of claim 9, wherein said carrier ring comprises a support for two wind converters.

13. The wind energy system of claim 1, further comprising a plurality of wind converters, wherein said retaining means comprises a plurality of carrier rings mounted at different heights on external circumferences of said chimney, and each carrier supporting one of said plurality of wind converters.

14. The wind energy system of claim 13, wherein at least one of said plurality of carrier rings comprises means for supporting two of said plurality of wind converters.

15. The wind energy system of claim 13, wherein each said plurality of carrier rings comprises a diameter greater than said external circumference of said chimney, thereby permitting the positioning of auxiliary structures between said carrier rings and said chimney.

16. The wind energy system of claim 1, wherein said retaining means comprises a rotary device rotatably connected to said receiving part for rotating about vertical central axis of the chimney; and an eccentric support mounted on said rotary device for eccentrically connecting said wind converter to said rotary device, said eccentric support comprising an eccentricity such that said rotor vanes pass said chimney at said distance that prevents aerodynamic shock loads on said rotor.

17. A process for assembling a wind energy system on a decommissioned chimney, comprising the steps of:

determining a highest connection point at which a wind converter system is mountable on the decommissioned chimney without causing a structural overload of said chimney based on static and dynamic considerations of said chimney and a configuration of said wind converter, the wind converter system having an output of at least 600 kW;

shortening the decommissioned chimney such that the wind converter system is mountable at the highest connection point;

connecting a receiving part proximate the upper end of the shortened chimney; and attaching a retaining device to the receiving part of the decommissioned chimney for rotatably supporting the wind converter system about a vertical rotational axis such that rotor vanes of the wind converter system are a distance from the decommissioned chimney that prevents aerodynamic shock loads on said rotor.

* * * * *